Jan. 13, 1970  R. E. PAULSEN ET AL  3,490,059
THREE AXIS MOUNTING AND TORQUE SENSING APPARATUS
Filed June 6, 1966  4 Sheets-Sheet 1

INVENTOR.
REX E. PAULSEN
DALE H. WINE
BY

*Sheridan and Ross*

ATTORNEYS

Jan. 13, 1970  R. E. PAULSEN ET AL  3,490,059
THREE AXIS MOUNTING AND TORQUE SENSING APPARATUS
Filed June 6, 1966  4 Sheets-Sheet 2

INVENTOR.
REX E. PAULSEN
DALE H. WINE
BY

Sheridan and Ross

ATTORNEYS

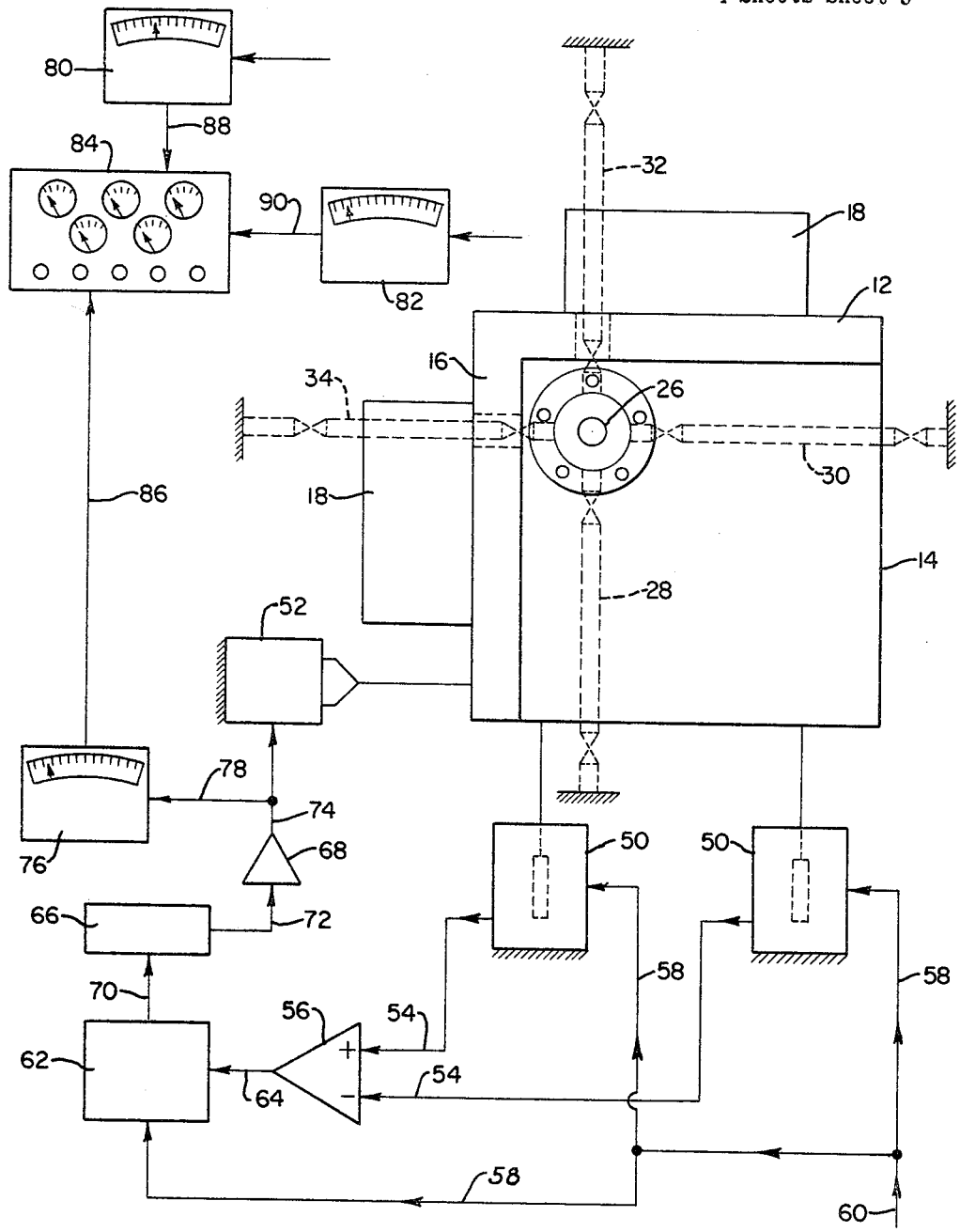

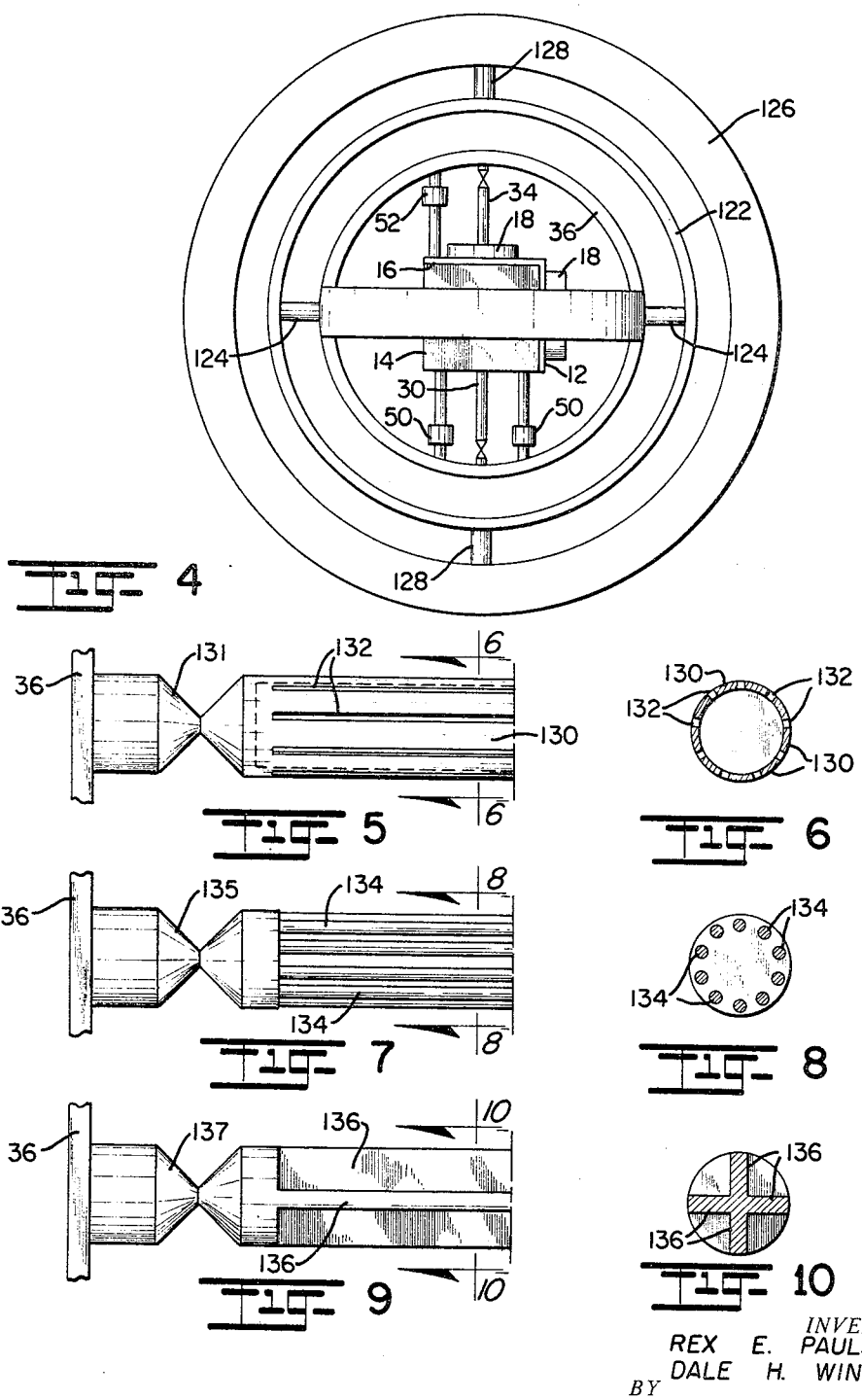

United States Patent Office 3,490,059
Patented Jan. 13, 1970

3,490,059
THREE AXIS MOUNTING AND TORQUE
SENSING APPARATUS
Rex E. Paulsen and Dale H. Wine, Littleton, Colo., assignors to Martin-Marietta Corporation, New York, N.Y., a corporation of Maryland
Filed June 6, 1966, Ser. No. 555,594
Int. Cl. G01l 3/00; G01p 15/08
U.S. Cl. 73—133
14 Claims

ABSTRACT OF THE DISCLOSURE

The apparatus includes a plurality of elongated suspensor member which connect a mounting or support platform to a reaction support so that movement of the platform relative to the support is limited to rotational movement about the virtual suspension point of the platform. The elongated suspensors are relatively rigid in compression and tension and are arranged so that their longitudinal axes intersect to define the virtual suspension point. The suspensors restrain translational movement of the platform relative to the reaction support and permit limited rotational movement about the suspension point. An electrical measuring system may be connected to the apparatus to measure torques about three or more axes. For such an application, it is desirable to arrange the center of gravity of the platform to coincide with the virtual suspension point so that no spurious forces are introduced into the measuring system. A platform restoring system may also be utilized to restore the platform to a neutral position.

---

This invention lies in the field of component mountings which provide for tilting of components in all directions with respect to a fixed or movable support point. One of its principal uses is the mounting of aircraft and space vehicle components in a laboratory in order to investigate their reaction torque effects under various conditions of operation. Another significant use is as a three degree of freedom platform mounted in aircraft or space vehicles, wherein the platform may be part of a navigation device, a mount for scientific apparatus, or the like.

It is common practice in the course of the design of vehicles for travel in the air or in space to determine the amount of rotational movement or torque developed by various components in response to maneuvers or internally developed forces and also to determine the direction of the movement or torque with respect to the mountings. This information, together with other information regarding translation forces, is used in the course of the design work to insure integrity of the vehicle and of the components and also to assist in the study and solution of guidance and control problems.

In order to obtain the desired information the torque forces must be separated from the translation forces and each group must be measured independently. For each group, the forces are measured in three orthogonal or mutually perpendicular directions and the measurements are then combined to find the amount and direction of the resultant force. The present invention is concerned solely with the rotational or torque forces. It is customary to measure torque about an individual axis by sensing the deflection of a torsional spring about this axis and it is easy to balance torque generating equipment on the sensing device so that a linear acceleration or a change in the direction of the gravity vector does not develop a spurious output signal. If torques are to be measured simultaneously on three orthogonal axis, however, the problem assumes a different order of magnitude.

The present invention embodies an apparatus which will simultaneously measure torques about three orthogonal or mutually perpendicular axes to a high degree of accuracy. It is relatively undisturbed by linear acceleration or by any change in the direction of the gravity vector, and it will inhibit its own deflection so that a torque about one axis will not disturb the alignment of the other two axes with respect to the reference structure, thus preventing erroneous rotations from occurring on the deflected axes. No gimbals, bearings, or friction producing hardware are used, hence a minimum threshold and high sensitivity are assured.

Generally stated, the apparatus includes a platform adapted to support one or more torque-generating components and having a virtual suspension point which is normally within the outline of the platform, a reaction support for the platform, and a plurality of suspensors connecting the platform to the reaction support to provide limited rotation of the platform about its suspension point in all directions relative to the reaction support while restraining the platform against translation in any direction relative to the reaction support. In the preferred form, the suspensors are rather slender elongate members having their opposite ends connected respectively to the platform and its support, and their longitudinal axes intersect at the suspension point. They may extend radially in any direction but preferably they are aligned with the orthogonal axes passing through the suspension point. In any form, they are compliant in torsion and flexure but are axially stiff.

The preferred suspensors are solid or hollow rods or groupings of rods arranged to provide high axial stiffness, high compliance for torsional loads, and high compliance for flexural loads. One method of achieving the above properties is to use a rod of substantial cross sectional area which is necked down at one point along its length sufficiently to render the rod weak elastically in both torsion and flexure at such point. A preferred method is to neck the rod down at two points, one near each end of the rod. This removes the necessity for the necked-down point to be precisely at the point of virtual suspension, a requirement which can obviously only be met by one of the assemblage of suspensor rods.

Flexural compliance is provided by necking down as outlined above. An independent degree of design control over the torsional compliance of the rod can be accomplished by fluting the rod in the manner of a male spline. Tubular rods can be slotted, the slots cutting completely through the tubular wall and running parallel to the tubular axis. Groupings of rods arranged parallel to each other can also be employed, said rods being fixedly attached to a solid member at either end. Following the principles set forth above, one skilled in the art can proceed to design a system of suspensors having the required characteristics of axial stiffness, and of flexural and torsional compliance for a wide range of requirements. For rigid suspensors, a minimum of three provides for support. Since the three innermost necked-down parts can not occupy the same suspension point, rotation will be accompanied by minute translations. In installations where these translations are not acceptable, an arrangement of four, five or six suspensors may be provided to avoid translations.

Suspension can also be accomplished with elements such as wires or tapes which are stiff in tension only. In this case the preferred form incorporates four, five, or six suspensors, all of which are attached in tension to accomplish the same end result.

If it is desired that the suspended platform exhibit isoelastic properties with respect to the reaction support, this can be achieved through suitable design of the individual suspensors and, to some necessary extent, the geometry of their arrangement, or through use of identical suspensors and a perfectly symmetrical geometrical arrangement. Examples of such symmetrical arrangement are for four suspensors to be arranged to intersect at a point and be normal to the faces of a tetrahedron or for six suspensors to be arranged to intersect at a point and be normal to the faces of a cube. The kinematic principles underlying the present device may be explained by means of an example: Let any three dimensional body be constrained by four or more taut thin metal wires intersecting at the center of gravity (C.G.) of the body and configured so that translation of the C.G. is restrained in any direction. Attach the inner ends of the wires to the surface of a small sphere surrounding the C.G., and the outer ends to a common supporting structure. The length of the wires should be at least an order of magnitude larger than the radius of the sphere. The wires are stiff in tension but offer small resistance to bending or torsion. Accordingly, translation of the C.G. is effectively prevented while rotation about the C.G. is relatively free, especially for small rotations. The wires can be replaced by rods necked down near their ends and made suitably compliant in torsion. The rods need not be held in tension since they are able to take bi-directional axial loads. But the effect with the rods will be the same as with the wires, that is, to define a point of suspension about which the platform is free to rotate, in short, a flexural pivot.

With any of the mounting schemes described above it will be apparent that the platform can tilt or rotate in any direction but it can not translate relative to the reaction support. The platform may have any shape suitable for the particular purpose such as a closed or open box or a cruciform structure, and may have flats or other forms best adapted for attaching particular components. One or more components may be mounted on the platform depending on the test to be conducted. If necessary, adjustable weights are attached to the platform so that the center of gravity of the platform and component assembly will coincide with the suspension point. Therefore linear translation or tilting of the total apparatus will produce no spurious torsion effects which would modify the desired readings.

The torque forces to be determined may result from various causes. An external force of any kind may be applied to a component, resulting in torque. A gyro will produce a torque when tilted in some directions. A component in the form of an electric motor will produce a reaction torque when the motor is actuated. In order to apply rotational motions which will result in torques to be measured, the reaction support may be tiltably mounted on a base. In one form, the reaction support comprises the inner gimbal of a three axis table.

In order to determine the torque about any one axis, a pair of sensors or pickoffs is connected between the platform and the reaction support in a plane perpendicular to that axis with their axes parallel to each other, perpendicular to the axis and spaced to each side of it. The sensors may be magnetic linear transformers or any suitable equivalent, and their axial extension or contraction will produce signals indicative of the amount of rotation of the platform about the axis. When the platform is in neutral position the sensors are nulled. An electrical linear force actuator, or forcer, is also connected between the platform and the reaction support off-center from the axis in the same way as the sensors. When the platform rotates, the forcer acts in response to the signals from the sensors to move the platform back to its neutral position and again null the sensors. The current flowing through the forcer is proportional to the force exerted by the forcer and hence to the torque developed on the platform. A signal proportional to the current is fed to an indicating means which may be observed by the operator.

Similar equipment is provided for each of the other two axes and all of it acts simultaneously so that the operator can determine torque about all three axes at the same time. In addition, signals are fed from all three indicators to a collator which will then produce indications of the total torque and its direction of application. The high accuracy of the apparatus results from the fact that, for practical purposes, the forcer maintains the platform exactly in neutral position and eliminates any errors of cross-coupling or mis-calibration of the sensors and also eliminates any resilient restoring force of the suspensors because they are also in neutral condition.

Because of the nature of the operation, the necessary signals are obtained with practically no rotary movement of the platform. This in itself eliminates errors which might result from manufacturing tolerances in the apparatus. In the apparatus here disclosed, the angular movement is easily constrained to the order of one minute of arc. Through careful attention to design detail, the use of high quality components, and the application of a high-gain servo loop, angular constraints of a few seconds of arc can be obtained. In some applications, restriction of the gimbals to such small excursions is the design objective rather than the measuring of torques.

A further disadvantage of conventional torque testing apparatus is that the usual substantial rotary movements which are necessary to obtain usable readings require relatively moving parts, such as bearings. They can be used fairly successfully for one-axis testing with component weights up to about 1000 pounds. Beyond this, the bearing loads build up resistance to movement to such an extent that they create serious errors in readings. At much higher loads the bearings are completely inadequate, and the apparatus is virtually unworkable. At the present time it has become necessary to run tests with components weighing as much as 10,000 pounds. The apparatus of the present invention operates equally well with loads of this magnitude and with loads of only a few pounds because of elimination of the need for substantial movement. The various elements of the apparatus are simply made of a size comparable to the magnitude of the load.

The basic apparatus discussed above provides a simple but highly suitable basis for a quasi-strapdown inertial guidance system in which the platform is permitted only limited freedom with respect to the vehicle. In a typical quasi-strapdown mode, the output of gyros mounted on the platform is fed into the servo amplifiers which in turn drive the platform torquers, thus maintaining the platform inertially stable. When the precision angular sensors between the platform and supporting structure indicate that a preset angle has been achieved on a given axis, the platform is reset by torquing the gyro that controls such axis.

Various other advantages and features of novelty will become apparent as the description proceeds in conjunction with the accompanying drawings, in which:

FIGURE 3 is a diagrammatic plan view of the apparatus of FIGURE 1 with a schematic showing the electrical instrumentation;

FIGURE 4 is a plan view of the apparatus of FIGURE 1 including additional supporting members;

FIGURE 5 is a fragmentary perspective view showing a modified form of suspensor;

FIGURE 6 is a vertical section taken along line 6—6 of FIGURE 5;

FIGURE 7 is a similar view showing a further modified form of suspensor;

FIGURE 8 is a vertical section taken along line 8—8 of FIGURE 7;

FIGURE 9 is a still further modified form of suspensor; and

FIGURE 10 is a vertical section taken along line 10—10 of FIGURE 9,

Figure 1:
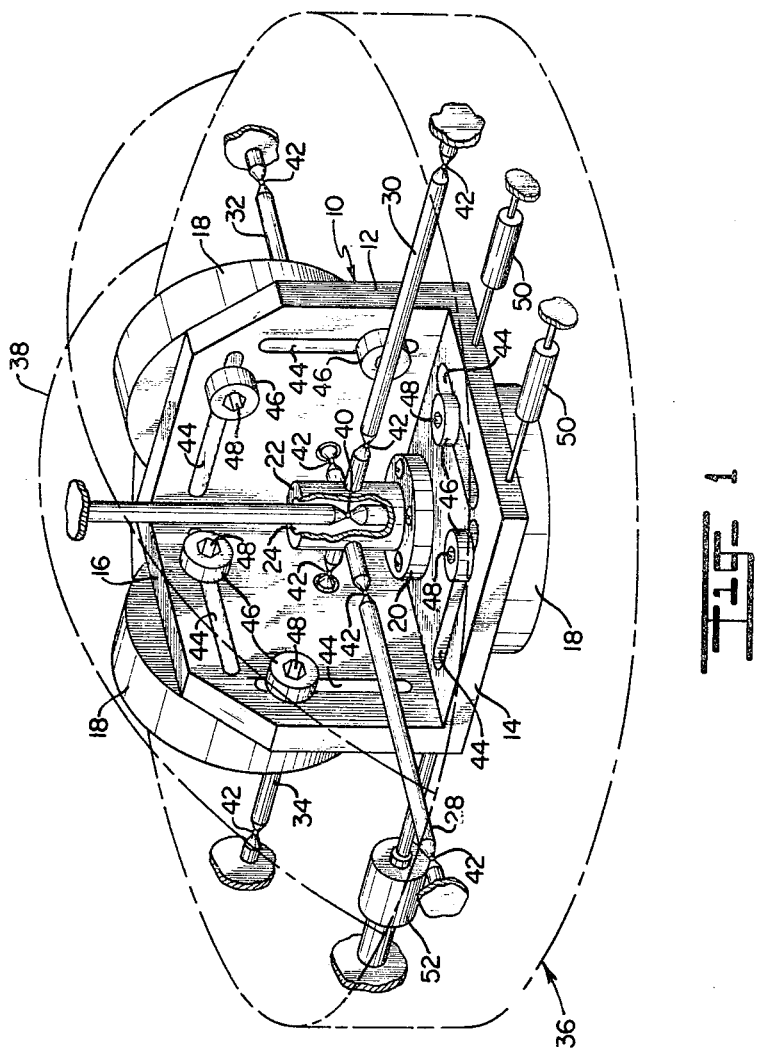
FIGURE 1 is a diagrammatic view in perspective of one form of apparatus of the present invention.

One typical form of the apparatus of the invention is illustrated in FIGURE 1 in which the platform 10 is shown as composed of three orthogonally arranged plates 12, 14, and 16 forming three sides of an open box and presenting flat faces for the mounting of three components 18 on which a torque test is to be performed. These components may be of any nature, such as an inertial element, a gyro, a reaction wheel, or an electric motor.

A mounting spool for the platform consists of a disk 20 secured to the horizontal plate 14 and a cylinder 22 integral with the disk and having a vertically extending bore 24 to freely receive a vertically extending first suspensor 26, the lower end of which is rigidly connected to the center of disk 20. Four other suspensors 28, 30, 32, and 34 are arranged in the horizontal plane with their longitudinal axes intersecting at the longitudinal axis of suspensor 26. The inner end of each of these four suspensors is rigidly attached to the wall of cylinder 22. The outer ends of these four suspensors are rigidly attached to a reaction support 36, illustrated as being in the form of a ring, and the upper outer end of suspensor 26 is rigidly attached to arch 38 which is integral with and forms a part of support 36. The latter may be rigidly fixed in place or tiltably supported, as will be described later.

In the form just described, all of the suspensors are solid rods which are unyieldable in both tension and compression. It will be apparent that the spool and attached platform can be held against translation by a minimum of three rods such as 26, 28, and 30, and that these rods are not required to be mutually perpendicular. The minimum arrangement may be used for small loads or for tests where the accuracy requirement is not too severe. However, the arrangement shown in FIGURE 1 is preferable for the majority of test work. Suspensor 26 is necked down at point 40 to define a virtual suspension point for the platform, which is the point about which the platform may tilt or rotate in all directions relative to reaction support 36. The reduction in area at point 40 provides for elastic twisting and bending while the rod remains unyielding on its longitudinal axis. It therefore provides a first reference axis about which the platform may rotate and allows the necessary bending for the platform to rotate about other axes.

The other four rods are necked down near their inner and outer ends as indicated at 42 to provide elastic yielding in bending and torsion but not in longitudinal tension and compresion. Rods 30 and 34 define a second reference axis of rotation perpendicular to that of rod 26, and rods 28 and 32 define a third reference axis of rotation perpendicular to the other two. Thus a set of three orthogonal reference axes is provided so that the test results can be considered individually and also collated and combined into a single final resultant torque in a single direction.

In order to prevent the imposition of any spurious torque loads on the system it is necessary for the center of gravity of the platform and component assembly to coincide with the suspension point 40. In some cases the components can be arranged to accomplish this result but ordinarily the balancing is done by proper placement of auxiliary weights. In the example shown, the platform is provided with a plurality of mounting slots 44. Disks 46 are eccentrically mounted on bolts 48 which may be secured at any point along the length of their respective slots.

In operation the development of torque on the platform by the components will produce tilting of the platform in some direction which ordinarily will not coincide with rotation about any one of the reference axes. Hence the torque will automatically be resolved into components about each of the three reference axes which in turn will cause rotation about each of these axes. A separate sensing and restoring system is provided for each axis but only one such system is shown for clarity of illustration and explanation.

Two sensors 50 are connected between the margin of plate 14 and the reaction support 36. They are parallel to each other, lie in a plane perpendicular to the axis of suspensor 26, and are spaced at opposite sides of the intersection of that axis with their plane. The sensors or pick-offs may be of any suitable type such as magnetic linear transformers or equivalent, which have been found to be highly satisfactory. Any rotation of the platform about the axis of suspensor 26 will result in extension or contraction of the sensors, producing a signal corresponding to the extent of rotation. The signals are fed through a signal amplifier, later described, to an electrical linear force actuator, or forcer, 52. The latter is connected between the reaction support and the opposite margin of plate 14 at a point laterally spaced from the axis of suspensor 26. When current is supplied to the forcer it extends and turns the platform back to its neutral position, and the sensors are nulled. The amount of current passing through the forcer is an accurate indication of the inertial torque being developed about the axis of suspensor 26 and can be calibrated in terms of such torque.

FIGURE 3 is a diagrammatic plan view of the platform-component assembly of FIGURE 1 with a schematic showing of the circuitry involved. Conductors 54 lead from sensors 50 to the differential AC amplifier 56. Conductors 58 lead from the AC excitation source 60 to sensors 50 and also to one side of demodulator 62, the other side of which is fed from amplifier 56 by conductor 64. The output from the demodulator is transmitted through stabilizing network 66 and DC amplifier 68 to the forcer 52 by way of conductors 70, 72, and 74, and also to the output indicator 76 by branch conductor 78. Forcer 52, acting in response to the output, extends sufficiently to force the platform back around the axis of suspensor 26 to its neutral position, and the sensors 50 are nulled. The output transmitted to indicator 76 is proportional to the torque developed on the platform about this particular axis.

Duplicate systems are provided to respond to torque about the axes of suspensors 30, 34, and 28, 32, and appropriate signals are transmitted to output indicators 80 and 82. All of these outputs can be reconsidered and recorded separately for subsequent study, and they may also be further transmitted to collator 84 by conductors 86, 88, and 90 where they may again be displayed in addition to a display of the summation torque and its direction.

Figure 2:
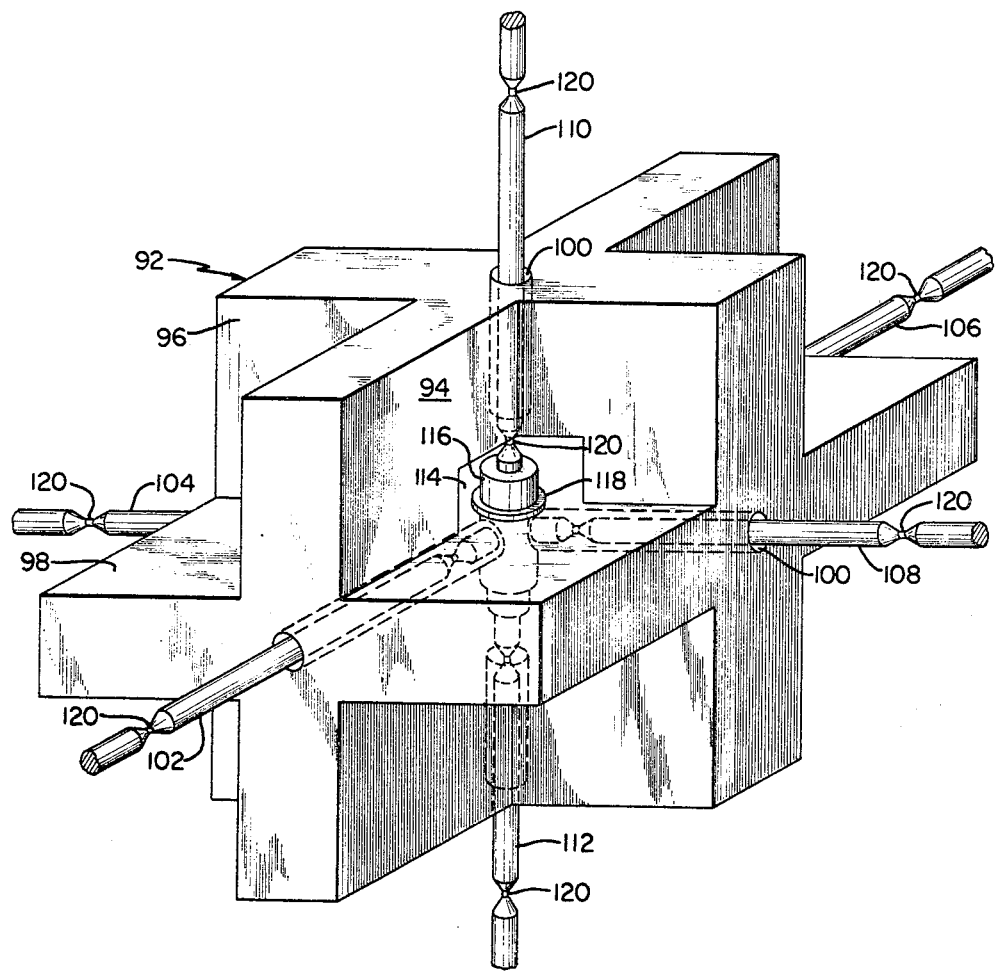
FIGURE 2 is a similar view of a modified form of the apparatus.

A modified form of the apparatus is illustrated in FIGURE 2, in which a double cruciform platform 92 is composed of three webs 94, 96, 98 arranged in orthogonal relation and intersecting along three orthogonal axes. Bores 100 are formed in all of the web intersections to freely receive suspensors 102, 104, 106, 108, 110, 112, all of which are rigidly attached at their outer ends to a reaction support such as the ring 36 and arch 38 of FIGURE 1, the arch being formed as a second continuous ring to support both suspensors 110 and 112.

The webs are cut away at their mutual intersection to form a cavity 114 to receive a spool 116 having a flange 118 rigidly connected to the platform. The suspensors are all rigidly connected to the spool to form a six way support for the platform and their longitudinal axes all intersect at a common point which is the virtual suspension point of the platform. Each of the supensors is necked down at 120 in the same manner as those of FIGURE 1, but the upper suspensor 110 does not pass through the suspension point. Instead, it is formed in the same way as the others. This six-rod symmetrical suspension is provided with the same torque sensing and restoring equipment as the form of FIGURE 1 and is operated in the same way. Obviously balance weights and components may be mounted in many locations and attitudes.

The apparatus of FIGURE 1 may be rigidly mounted by way of ring 36 on a stationary support or it may be tiltably mounted as illustrated in FIGURE 4. Here it will be seen that ring 36 comprises the inner gimbal of a three axis table. It is pivotally mounted to intermediate ring 122 by means of pivotal supports 124 in order to tilt about a first axis. Ring 122 is in turn pivotally mounted to the outer base ring 126 by means of pivotal supports 128 which are aligned perpendicular to supports 124 to provide tilting about the second axis. Base ring 126 may be fixedly attached to a stationary support or it may be mounted for rotation in its own plane about a vertical axis.

The tiltable mounting extends the scope of testing operations and thus increases the utility of the apparatus. For instance, ring 36 can be tilted suddenly in any direction to simulate a maneuver which would apply an external force resulting in a torque reaction on the platform. Also, ring 36 may be tilted to any desired angular position and locked in place to produce gravity vectors in different directions.

The fragmentary views in FIGURES 5, 7 and 9 illustrate modified forms of suspensors which may be used in place of the solid rods of FIGURES 1 to 4. In FIGURES 5 and 6 the modified suspensor comprises a hollow rod 130 rigidly connected to a solid necked-down portion 131, which in turn connects to ring 36 in the same way as rod 28 of FIGURE 1. However, the elastic compliance in torsion is increased by reducing cross-sectional area in a different way. In this case a portion of the length, preferably a major portion, is cut away to form slots 132 through the thickness of the rod wall.

In FIGURES 7 and 8 the suspensor comprises a group of individual slender rods 134 preferably spaced uniformly around a central longitudinal axis and rigidly connected at their ends to a solid necked-down portion 135, which in turn connects to ring 36.

In FIGURES 9 and 10 the suspensor comprises a central fluted rod 136, shown for illustration only as a cruciform cross section, said central rod connecting to a solid necked-down portion 137, which in turn connects to ring 36.

Although only one necked-down portion is shown in each of FIGURES 5, 7 and 9, it should be understood that a necked-down portion may be provided at the other end of each such suspensor. The usual configuration uses necked-down portions at both ends of a suspensor, as noted above.

Known torque testing devices are based on very substantial rotational movement of the test articles and therefore require moving-part bearings of some kind, and the torque is determined by the amount of movement against a resilient resistance. Thus friction, overloaded bearings, etc. introduce unknown forces into the testing operation. Since the amount of these forces cannot be determined, there is no way to correct erroneous readings. Moreover, it is extremely difficult and complicated to produce such an apparatus which can be used to test torques about more than one axis at a time. When separate tests are made, it is difficult to absolutely duplicate the disturbing torque which is developed.

On the contrary, the present apparatus is mechanically simple, rugged, and reliable and is so devised as to eliminate almost all possibility of error. The angular motion of the platform in any direction is only of the order of one minute of arc, and the restoring force is indicated when the platform is practically in neutral position. Once the restoring current is calibrated against a known torque force the only possible error is in a change of calibration, and this can be easily checked as often as necessary. The miniscule angular movement also eliminates cross-coupling problems which arise with wide angular sweeps.

Basically the same apparatus can be used for quasi-strapdown inertial guidance systems. Considering the apparatus of FIGURE 1, the components 18 may be directional sensing gyros. When they sense a change in attitude their signals are sent through suitable amplifying equipment to the forcers 52 which torque the platform back to the position in which the gyros are neutral. Sensors like elements 50 can then sense this change and transmit signals to the guidance and control computers.

We claim:

1. A three-axis torque sensing apparatus comprising: a platform having a virtual suspension point; a reaction support for said platform; means mounting said platform on said reaction support for limited rotation of said platform about said suspension point in all directions relative to said reaction support, said mounting means elastically resisting rotation of said platform out of a null position and restraining said platform against translation in any direction relative to said reaction support; motion sensing means connected between said platform and said reaction support to sense the amount of rotation of said platform about any of three orthogonal axes out of its predetermined original attitude; and forcing means connected between said platform and said reaction support and responsive to signals from said sensing means to force said platform back to its original attitude.

2. Apparatus as claimed in claim 1; said reaction support being mounted for movement in various directions to apply rotational motions to the platform and any components mounted thereon.

3. Apparatus as claimed in claim 1; and weight means adjustably mounted on said platform to counter balance any components mounted thereon and locate the center of gravity of the platform assembly at said suspension point.

4. Apparatus as claimed in claim 1, said mounting means comprising elongate suspensors fixedly secured at their opposite ends to said platform and said reaction support, with their longitudinal axes intersecting at said suspension point; said suspensors being elastically compliant in torsion and flexure and axially stiff.

5. Apparatus as claimed in claim 4, a portion of the axial length of each suspensor being of substantially less cross sectional area than the remainder to reduce its torsional and flexural resistance.

6. Apparatus as claimed in claim 4, each of said suspensors comprising a metallic rod with at least one necked-down portion in its axial length to produce a zone of reduced torsional and flexural resistance.

7. Apparatus as claimed in claim 6, each of said suspensors comprising an elongate metallic member having a plurality of peripherally spaced longitudinally extending cut-away portions extending at least along the intermediate portion of its length to reduce its cross sectional area and torsional resistance.

8. Apparatus as claimed in claim 6 each of said suspensors comprising an assemblage of a plurality of discrete, slender, elongate members arranged in closely spaced parallelism and having their opposite ends fixedly secured to said necked down portion.

9. Apparatus as claimed in claim 6, each of said suspensors comprising an elongate metallic member constructed by longitudinal fluting of a solid rod, said fluting extending along the intermediate portion of its length to reduce its cross-sectional area and torsional resistance.

10. Apparatus as claimed in claim 4, said suspensors being in axial alignment with the three orthogonal axes about which the torsional movements are to be sensed.

11. Apparatus as claimed in claim 4, said suspensors being three in number and each being in alignment with one of the three axes about which the torsional movements are to be sensed; each suspensor being rigid in tension and compression to constitute the minimum number of suspensors which will prevent translation of the platform while permitting limited rotation in all directions.

12. Apparatus as in claim 1, and indicating means connected to said forcing means to indicate the torque exerted by said platform as a function of the force exerted by said forcing means.

13. Apparatus as claimed in claim 12, and a collator connected to the indicating means for each of the forcing means to receive signals from said indicating means and collate them into summary indications of the total amount of torque on the platform and the angular direction of its application.

14. Means for mounting one or more components for tilting about a plurality of axes, comprising: a platform adapted to support said component or components and having a virtual suspension point; a reaction support for said platform; and a plurality of elongate suspensors fixedly secured at their opposite ends to said platform and said reaction support, with their longitudinal axes intersecting at said suspension point, said suspensors comprising elongate rods which are rigid in both tension and compression, a portion of the axial length of each rod being of substantially less cross-sectional area than the remainder to reduce its torsional and flexural resistance, so that it is torsionally and flexurally compliant and axially stiff to provide limited rotation of said platform about said suspension point in all directions relative to said reaction support and to restrain said platform against translation in any direction relative to said reaction support.

References Cited

UNITED STATES PATENTS

| | | | |
|---|---|---|---|
| 2,865,205 | 12/1958 | Lear et al. | 74—5 |
| 2,960,302 | 11/1960 | Brown | 248—358 |
| 3,277,840 | 10/1966 | Yao-Tzuli. | |
| 3,360,255 | 12/1967 | Ormond | 308—2 XR |
| 2,950,079 | 8/1960 | Horsfall | 248—358 XR |

CHARLES A. RUEHL, Primary Examiner

U.S. Cl. X.R.

73—517; 308—2